US010914581B2

(12) United States Patent
Atherton

(10) Patent No.: US 10,914,581 B2
(45) Date of Patent: Feb. 9, 2021

(54) POWER TRANSFER CONFIGURATION FOR SUPPLYING POWER TO A DETACHABLE PROBE FOR A COORDINATE MEASUREMENT MACHINE

(71) Applicant: Mitutoyo Corporation, Kanagawa-ken (JP)

(72) Inventor: Kim Atherton, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 273 days.

(21) Appl. No.: 16/307,673

(22) PCT Filed: Jun. 30, 2017

(86) PCT No.: PCT/US2017/040404
§ 371 (c)(1),
(2) Date: Dec. 6, 2018

(87) PCT Pub. No.: WO2018/006032
PCT Pub. Date: Jan. 4, 2018

(65) Prior Publication Data
US 2019/0145764 A1 May 16, 2019

Related U.S. Application Data

(60) Provisional application No. 62/357,683, filed on Jul. 1, 2016.

(51) Int. Cl.
*G01B 5/008* (2006.01)
*G01B 21/04* (2006.01)

(52) U.S. Cl.
CPC ........... *G01B 21/047* (2013.01); *G01B 5/008* (2013.01)

(58) Field of Classification Search
CPC .................. G01B 5/008; G01B 21/047
(Continued)

(56) References Cited

U.S. PATENT DOCUMENTS 4,038,625 A 7/1977 Tompkins et al.
4,651,405 A 3/1987 McMurtry
(Continued)

FOREIGN PATENT DOCUMENTS

CN 101675317 A 3/2010
EP 0 856 377 A1 8/1998
(Continued)

OTHER PUBLICATIONS

Anonymous, "Inductive Coupler Nic . . . —M30—Instructions for Use," TURCK, Apr. 22, 2016, 34 pages.
(Continued)

*Primary Examiner* — George B Bennett
(74) *Attorney, Agent, or Firm* — Seed IP Law Group LLP

(57) ABSTRACT

A power transfer configuration is disclosed for providing power to a stored coordinate measurement machine (CMM) probe. A storage rack comprising at least one CMM probe receptacle is mounted proximate to a CMM. The CMM may automatically attach and detach from the CMM probe and insert and remove it from the storage rack probe receptacle. The power transfer configuration comprises a primary electromagnetic winding mounted to the storage rack proximate to the probe receptacle, and a secondary electromagnetic winding located internal to and proximate to the CMM probe housing. When the CMM probe is in the probe receptacle, the primary electromagnetic winding receives alternating current and generates a changing electromagnetic field proximate to the CMM probe housing. The secondary electromagnetic winding generates power in the CMM probe in response to receiving the changing electro- (Continued)

magnetic field. The CMM probe may be internally heated while stored, using the generated power.

11 Claims, 5 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 5,056,235 A * | 10/1991 | Thomas | ................. | G08C 15/04 |
| | | | | 33/503 |
| 5,109,223 A | 4/1992 | Schmitt et al. | | |
| 5,517,190 A | 5/1996 | Gunn | | |
| 5,526,576 A | 6/1996 | Fuchs et al. | | |
| 5,884,410 A * | 3/1999 | Prinz | ...................... | G01B 7/012 |
| | | | | 33/556 |
| 6,543,150 B2 * | 4/2003 | Matsumiya | ............ | G01B 7/012 |
| | | | | 33/503 |
| 6,772,527 B1 * | 8/2004 | Butter | ................. | G01B 11/007 |
| | | | | 33/503 |
| 7,024,783 B2 * | 4/2006 | Trull | .................... | G01B 21/047 |
| | | | | 33/503 |
| 7,652,275 B2 | 1/2010 | Gladnick | | |
| 7,692,121 B2 | 4/2010 | Pinilla et al. | | |
| 7,722,515 B2 | 5/2010 | McMurty et al. | | |
| 7,997,001 B1 | 8/2011 | Mekid | | |
| 8,381,588 B2 | 2/2013 | Butter et al. | | |
| 8,474,148 B2 | 7/2013 | Jonas et al. | | |
| 2001/0034948 A1 * | 11/2001 | Matsumiya | ............ | G01B 7/012 |
| | | | | 33/553 |
| 2002/0108446 A1 | 8/2002 | Matsuki et al. | | |
| 2004/0083024 A1 | 4/2004 | Wang | | |
| 2004/0185706 A1 * | 9/2004 | Price | .................... | G05B 19/128 |
| | | | | 439/488 |
| 2005/0172505 A1 * | 8/2005 | Trull | .................... | G01B 21/047 |
| | | | | 33/503 |
| 2008/0052936 A1 * | 3/2008 | Briggs | .................. | G01B 5/012 |
| | | | | 33/502 |
| 2009/0049704 A1 * | 2/2009 | Styles | .................. | G01B 21/047 |
| | | | | 33/503 |
| 2010/0206040 A1 | 8/2010 | Ebara | | |
| 2010/0206068 A1 | 8/2010 | Butter et al. | | |
| 2011/0143556 A1 | 6/2011 | Hsu | | |
| 2012/0228286 A1 | 9/2012 | Lutz et al. | | |
| 2012/0298706 A1 | 11/2012 | Gordon et al. | | |
| 2013/0162200 A1 | 6/2013 | Terry et al. | | |
| 2014/0120747 A1 | 5/2014 | Benjestorf | | |
| 2014/0203661 A1 | 7/2014 | Dayan et al. | | |
| 2014/0339914 A1 | 11/2014 | Pooley | | |
| 2016/0178362 A1 * | 6/2016 | Iseli | ...................... | G01B 3/008 |
| | | | | 33/503 |

FOREIGN PATENT DOCUMENTS

| | | |
|---|---|---|
| JP | 60-224005 A | 11/1985 |
| JP | 2006-258660 A | 9/2006 |

OTHER PUBLICATIONS

Extended European Search Report, dated Jan. 29, 2020, for corresponding European Application No. 17821401.1-1010 / 3479054, 7 pages.

* cited by examiner

POWER TRANSFER CONFIGURATION FOR SUPPLYING POWER TO A DETACHABLE PROBE FOR A COORDINATE MEASUREMENT MACHINE

BACKGROUND

Technical Field

This disclosure relates to precision metrology, and more particularly to supplying power to coordinate measurement machine probes while detached from a coordinate measurement machine.

Description of the Related Art

Coordinate measurement systems, e.g. 1-dimensional, or 3 dimensional measurement systems such as coordinate measurement machines (CMM's), can obtain measurements of inspected workpieces by using a touch probe to trigger the reading of a coordinate measurement gauge when a stylus of the touch probe contacts a workpiece. One exemplary prior art CMM described in U.S. Pat. No. 5,526,576, which is hereby incorporated herein by reference in its entirety, includes a touch probe for contacting a workpiece, a movement mechanism comprising multiple drives for moving the touch probe, and an associated electronic system including features related to processing signals in or from the touch probe head. Various CMM's may also be configured to scan a surface while a scanning type CMM probe is in contact with the surface. A CMM including a surface scanning probe is described in U.S. Pat. No. 7,652,275, which is hereby incorporated herein by reference in its entirety. As disclosed therein, a mechanical contact probe or an optical probe may scan across the workpiece surface.

During measurement operations the circuit components inside a CMM probe may generate heat which may affect the signals used for workpiece surface measurements and affect dimensions of mechanical portions of the CMM probe through thermal expansion or contraction. To counteract this problem, it is known to allow a CMM to provide power to a CMM probe attached to the CMM during a warmup period, such that the CMM probe has reached a steady state of temperature before beginning workpiece surface measurements. This can be time consuming and undesirable, especially for measurement operations that require the use of multiple CMM probes. Therefore, some means exist for expediting or avoiding a warmup period. For example, a CMM probe or a CMM probe head supporting the CMM probe may include a heat regulator configured to quickly raise a temperature of the CMM probe to a desired steady state. U.S. Pat. No. 8,474,148, which is hereby incorporated herein by reference in its entirety, discloses a heater configured to provide heat inside of a CMM probe head.

A coordinate measurement system may also be configured to provide power to a CMM probe while it is stored on a storage rack and detached from the CMM. U.S. Pat. No. 8,381,588 (the '588 patent), which is hereby incorporated herein by reference in its entirety, discloses a storage rack for holding various CMM probes while they are not in use. The storage rack is configured to supply power to the CMM probes while not in use, through electrical contacts in the top of the CMM probes which are ordinarily used during measurement to communicate with a CMM. The '588 patent also discloses a similar CMM probe storage rack which is configured to supply power to a laser within an analog scanning probe through a pair of floating pins on the side of the probe body. The power supplied to the CMM probe may raise the temperature of the CMM probe to a temperature which is approximately equal to the steady state temperature during measurement operations when it is attached to the CMM. However, in either case, the associated contact arrangement requires complex/expensive mechanical features, relatively precise alignment of the CMM probe in its receptacle in the storage rack, and certainty that each desired CMM matches the contact configuration in the storage rack. These aspects sometimes make powering the CMM in the storage rack expensive, unreliable or inconvenient. In various applications, it is desirable to provide a CMM probe which is configured to receive power while detached from a CMM (e.g. while in a storage rack) without the need for direct electrical contacts or battery elements.

BRIEF SUMMARY

This summary is provided to introduce a selection of concepts in a simplified form to allow a more rapid recognition and understanding of the various disclosed features and principles that are further described below in the Detailed Description. This summary is therefore intended only as a brief overview and is not intended to isolate key features of the claimed subject matter, nor is it intended to be used as an aid in determining the scope of the claimed subject matter.

A power transfer configuration for providing power to a stored coordinate measurement machine (CMM) probe is disclosed. The CMM probe is stored in a storage rack and is automatically attachable to and detached detachable from a coordinate measurement machine, wherein the storage rack is mounted proximate to a CMM and comprises a probe receptacle configured to accept and hold the CMM probe to be automatically inserted and removed from the probe receptacle by the CMM. The power transfer configuration may comprise: a primary electromagnetic winding mounted to the storage rack proximate to or within the probe receptacle, the primary electromagnetic winding configured to receive power from an alternative current generating power supply and generate a changing electromagnetic field proximate to a housing of the CMM probe held in the probe receptacle; and a secondary electromagnetic winding located internally to and proximate to a housing of the CMM probe held in the probe receptacle, the secondary electromagnetic winding generating power usable inside the CMM probe, in response to the changing electromagnetic field.

A storage rack including a primary electromagnetic winding may be configured for use with the power transfer configuration outlined above.

A method is disclosed for providing power to at least one coordinate measurement machine (CMM) probe which is detached from a coordinate measurement machine. The method comprises: holding the CMM probe in a probe receptacle of a storage rack, the probe receptacle comprising a primary electromagnetic winding mounted proximate to or within the probe receptacle, operating the storage rack to provide power to the primary electromagnetic winding and generate a changing electromagnetic field proximate to a housing of the CMM probe held in the probe receptacle, and generating power in a secondary electromagnetic winding in the CMM probe in response to the changing electromagnetic field.

DETAILED DESCRIPTION

Figure 1:
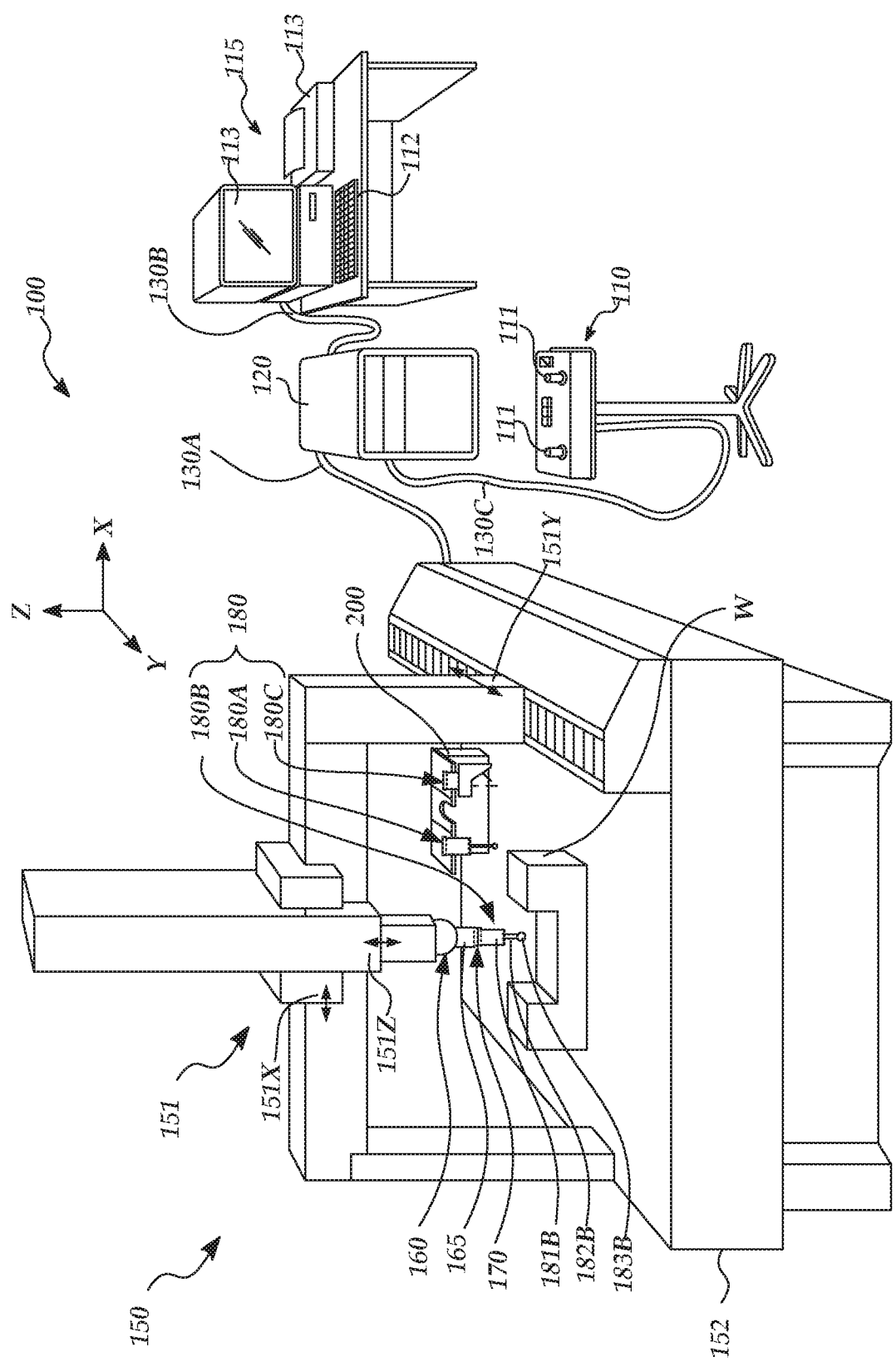
FIG. 1 is a diagram showing various exemplary components of a CMM.

FIG. 1 is a diagram showing various exemplary components of a measuring system 100 including a CMM 150 that utilizes interchangeable CMM probes 180. The measuring system 100 may include a manual operating unit 110, and a host electronic system comprising an interface electronics 120 and a host computer 115. The interface electronics 120 may include, for example, a motion controller that controls movements of the CMM 150, and interface circuits that connect to the CMM probe(s) 180 (e.g. through the signal and control lines 130A). The manual operating unit 110 may be coupled to the interface electronics 120 (e.g. through the signal and control lines 130C) and may include joysticks 111 for manually operating the CMM 150. The host computer 115 is coupled to the interface electronics 120 (e.g. through the signal and control lines 130B) and may operate the CMM 150 through user input or program control, and process measurement data for a workpiece W. The host computer 115 includes input means 112 (e.g., a keyboard, etc.) for inputting, for example, measurement conditions or instructions, and output means 113 (e.g., a display, printer, etc.) for outputting, for example, measurement results. In various embodiments, the host computer 115 and the interface electronics 120 may be merged and/or indistinguishable.

The CMM 150 includes a drive mechanism 151 which is located on a surface plate 152, and an attachment portion 165 (e.g. as included on an articulated head 160) for attaching an interchangeable CMM probe 180 to the drive mechanism 151. In various implementations, a CMM probe 180 (e.g. one of the CMM probes 180A-180C) may be automatically stored in a storage rack 200, and may be automatically removed from the storage rack 200 and attached to the attachment portion 165 (e.g. under the control of an inspection program) at an autojoint connection 170, which may comprise precise kinematic mounting features and electrical connections that provide a physical interface that is common to various interchangeable CMM probes or sensors, according to known principles. An exemplary known technique and mechanism usable for the storage rack 200 and/or automatic exchange of a CMM probe 180 to and from a kinematic mounting at the autojoint 170 are described in U.S. Pat. No. 4,651,405, which is hereby incorporated herein by reference in its entirety. However, it will be appreciated that other known techniques and mechanisms may be used. Implementations of a storage rack 200 for powering/heating stored CMM probes (e.g. the CMM probes 180) according to principles disclosed herein are described further below.

The drive mechanism 151 includes x-axis, y-axis, and z-axis slide mechanisms 151X, 151Y, and 151Z, for moving the CMM probe 180 three-dimensionally. In the particular implementation shown in FIG. 1, the CMM probe 180B, which is attached to the CMM at the autojoint 170, is a contact scanning type CMM probe and includes a probe body 181B, and a stylus 182B attached to a contact portion 183B. The stylus 182B is attached to the probe body 181B through a stylus suspension portion, which allows the contact portion 183B to freely change its position in three directions relative to the probe body when the contact portion 183B moves along a measurement path on the surface of the workpiece W.

The CMM probe 180B includes sensors and circuits that sense the deflection of the stylus 182B (reflecting the position of the contact portion 183B) and outputs deflection or position data to the interface electronics 120 (e.g. through the signal and control lines 130A). However, this type of CMM probe is exemplary only and not limiting. More generally, any compatible type of interchangeable CMM probe (e.g. a touch probe 180A, or a non-contact scanning probe 180C, or a chromatic point sensor, or a camera) or other sensor may be used according to the principles disclosed herein.

Figure 2:
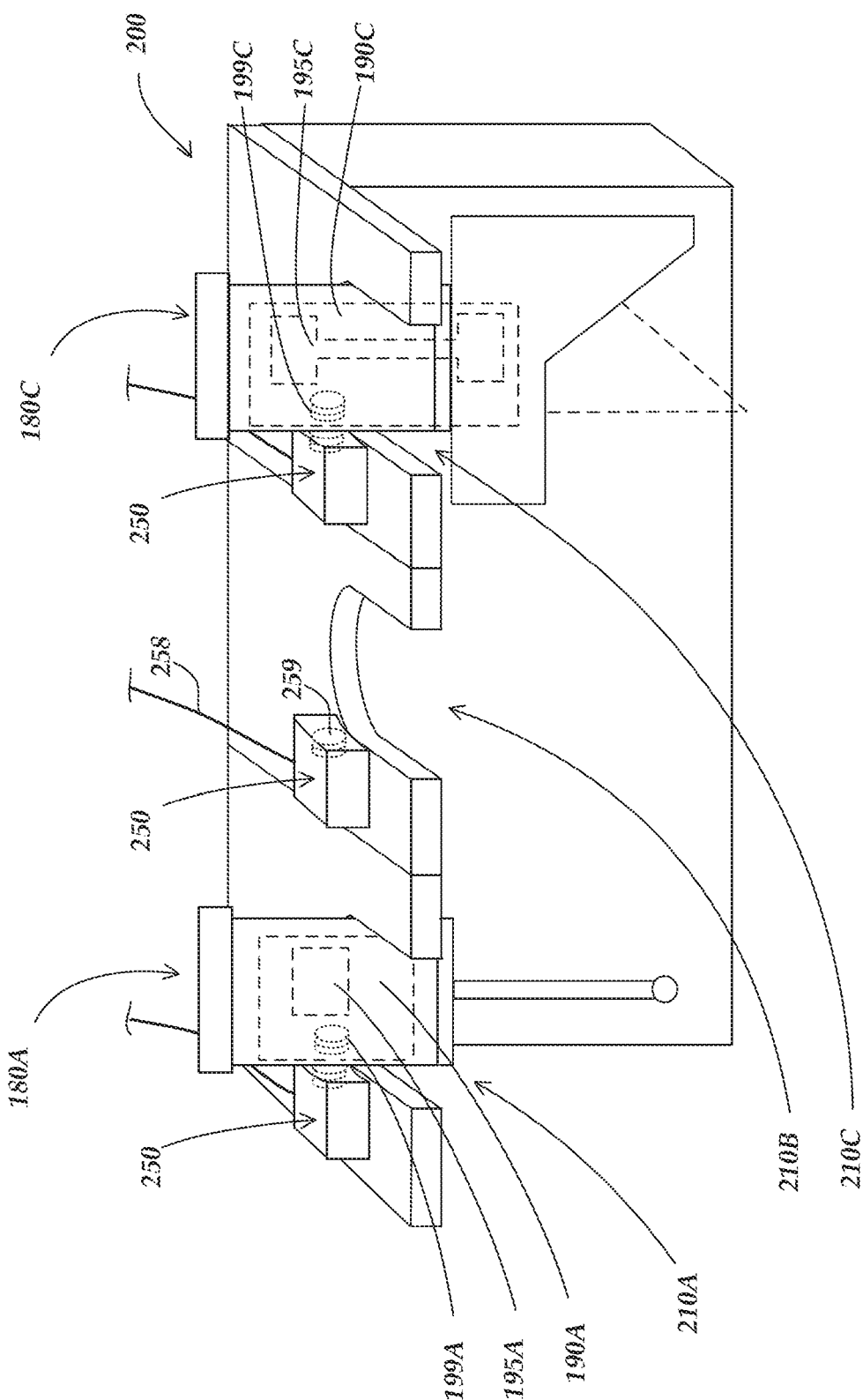
FIG. 2 is a partially schematic illustration of a storage rack 200 and CMM probes 180, including a power transfer configuration for powering and heating stored CMM probes according to principles disclosed herein.

FIG. 2 is a partially schematic illustration of a storage rack 200 and CMM probes 180, including a power transfer configuration for powering and heating stored CMM probes according to principles disclosed herein. Certain numbered components 1XX or 1XX' of FIG. 2 may correspond to and/or have similar operations as similarly numbered counterpart components 1XX of FIG. 1, and may be understood by analogy thereto, unless otherwise indicated by description or context below. This numbering scheme to indicate elements having analogous design and/or function may also be applied to the following FIGURES, where applicable.

As shown in FIG. 2, the storage rack 200 stores at least one CMM probe 180 (e.g. the CMM probes 180A, 180C, and 180B—shown in FIG. 1) which is automatically attachable to, and detachable from, a CMM. The storage rack 200 may be mounted proximate to a CMM such as the CMM 100. In the implementation shown in FIG. 2, the storage rack 200 comprises three probe receptacles 210A, 210B and 210C which are configured to accept and hold CMM probes 180, which may be automatically inserted and removed by the CMM. It will be appreciated that the probe receptacles 210A, 210B and 210C are schematically illustrated. It will be appreciated that the storage rack 200 and the probe receptacles 210A, 2106 and 210C may include known mechanisms that interface to known mechanical features on the CMM probes 180 for engaging and releasing the CMM probes 180 as they are automatically inserted and removed by the CMM. For example, the storage rack 200 may include receptacle mechanisms similar to known commercially available storage racks, and/or storage racks disclosed in Japanese Patent Number S60-224005, and/or European Patent No. EP 856377, and/or U.S. Pat. Nos. 8,381,588; 7,722, 515; each of which is hereby incorporated herein by reference in its entirety, or the like. In some implementations the storage rack may be connected to receive power from the CMM, for operating known powered mechanism and/or various elements disclosed herein.

FIG. 2 also shows one implementation of a power transfer configuration for powering and heating stored CMM probes 180 (e.g. 180A and 180C) according to principles disclosed herein. In the illustrated implementation, the power transfer configuration includes a primary electromagnetic winding module 250 comprising a primary electromagnetic winding 259 and a power supply line 258. The primary electromagnetic winding module 250 is mounted to the storage rack proximate to or within a probe receptacle 210 (e.g. one of the probe receptacles 210A, 2106 and/or 210C). The primary electromagnetic winding 259 is configured to receive alternating current power from a power supply (e.g. directly from the power supply line 258, or from an alternating current power supply in the module 250. The primary electromagnetic winding 259 generates a changing electromagnetic field proximate to an adjacent CMM probe 180 held in a probe receptacle 210 of the storage rack 200.

The power transfer configuration further comprises a secondary electromagnetic winding 199 (e.g. the illustrated secondary electromagnetic windings 199A, 199C shown in FIG. 2) internal to and proximate to a housing or cover of the adjacent CMM probe 180. The secondary electromagnetic winding 199 is positioned to receive the changing electromagnetic field generated by the primary electromagnetic winding 259, and generates power (e.g. produces alternative current) through electromagnetic induction, according to known principles. The secondary electromagnetic winding 199 and/or the proximate portion of the housing of the CMM probe 180 may be configured to optimally couple the secondary electromagnetic winding 199 to the changing electromagnetic field. For example, a metal housing of the CMM probe 180 may be thinned or removed at the location. If the housing is removed, a plastic cover or sealing material which does not shield the changing electromagnetic field may be used to seal the housing.

The secondary electromagnetic winding 199 is included in and connected to provide power to electronic components 190 included inside the CMM probe 180. In particular, in various implementations, the secondary electromagnetic winding 199 provides power to heat regulating components 195 that are included in the electronic components 190. In some implementations, the heat regulating components 195 simply comprise components that are normally used during measurement operations of the CMM (e.g. all, or only the primary heat generating components, of the CMM probe 180 may be powered by the secondary electromagnetic winding 199). On other implementations, the heat regulating components 195 may comprise a special purpose "storage rack heater" circuit, which in one implementation may comprise one or more powered resistors, a controlling temperature sensor and other suitable elements known in the art.

In various implementations, the heat regulating components 195 may be distributed at desirable locations in the CMM probe (e.g. as schematically represented by 195C). In any case, power supplied to the heat regulating components 195 provides heat to keep the CMM probe 180 at a similar temperature to a temperature it would have during measurement operations. This significantly reduces the need for a warm up period before a user begins accurate CMM measurement operations using the probe 180.

In various implementations, the heat regulating components 195 may be distributed at desirable locations in the CMM probe (e.g. as schematically represented by 195C). In any case, power supplied to the heat regulating components 195 provides heat to keep the CMM probe 180 at a similar temperature to a temperature it would have during measurement operations. This significantly reduces the need for a warm up period before a user begins accurate CMM measurement operations using the probe 180.

Figure 3:
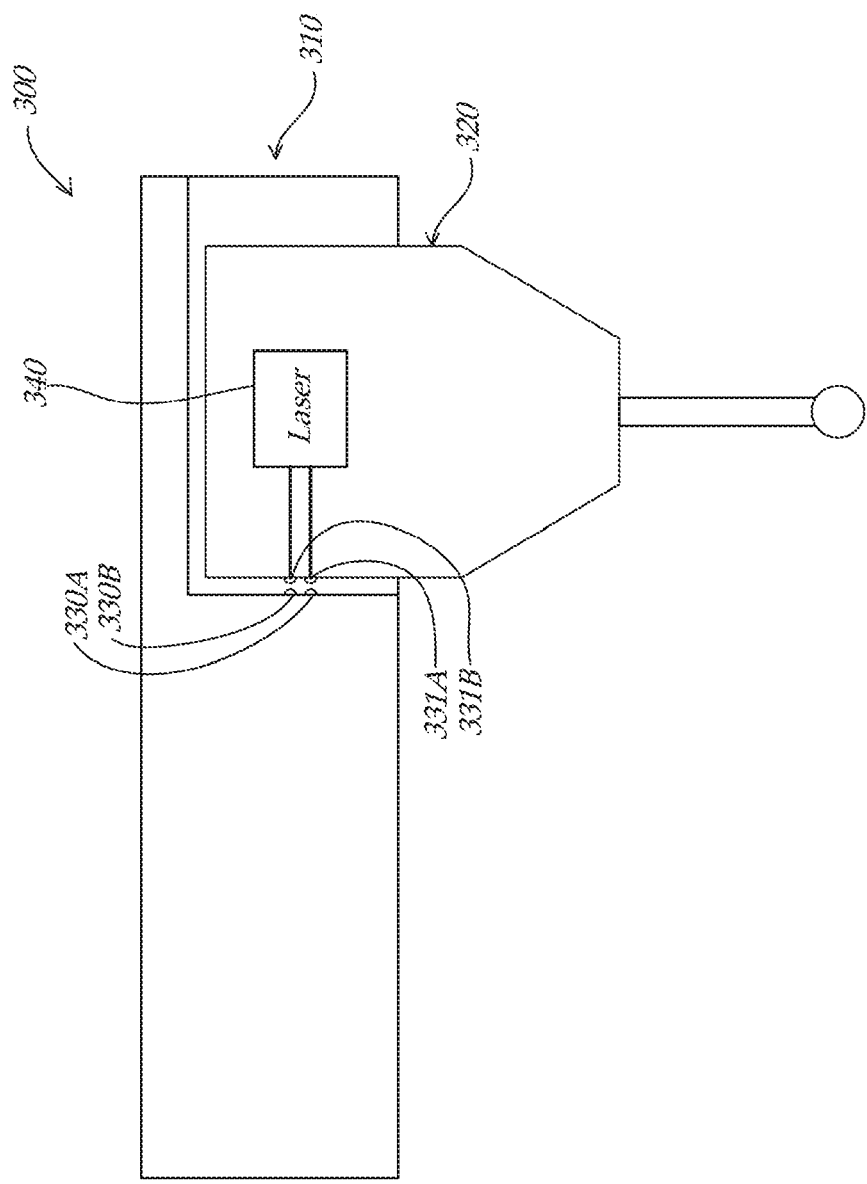
FIG. 3 is a partially schematic cross section illustration of a first prior art probe receptacle of a storage rack usable for powering a stored CMM probe.
Figure 4:
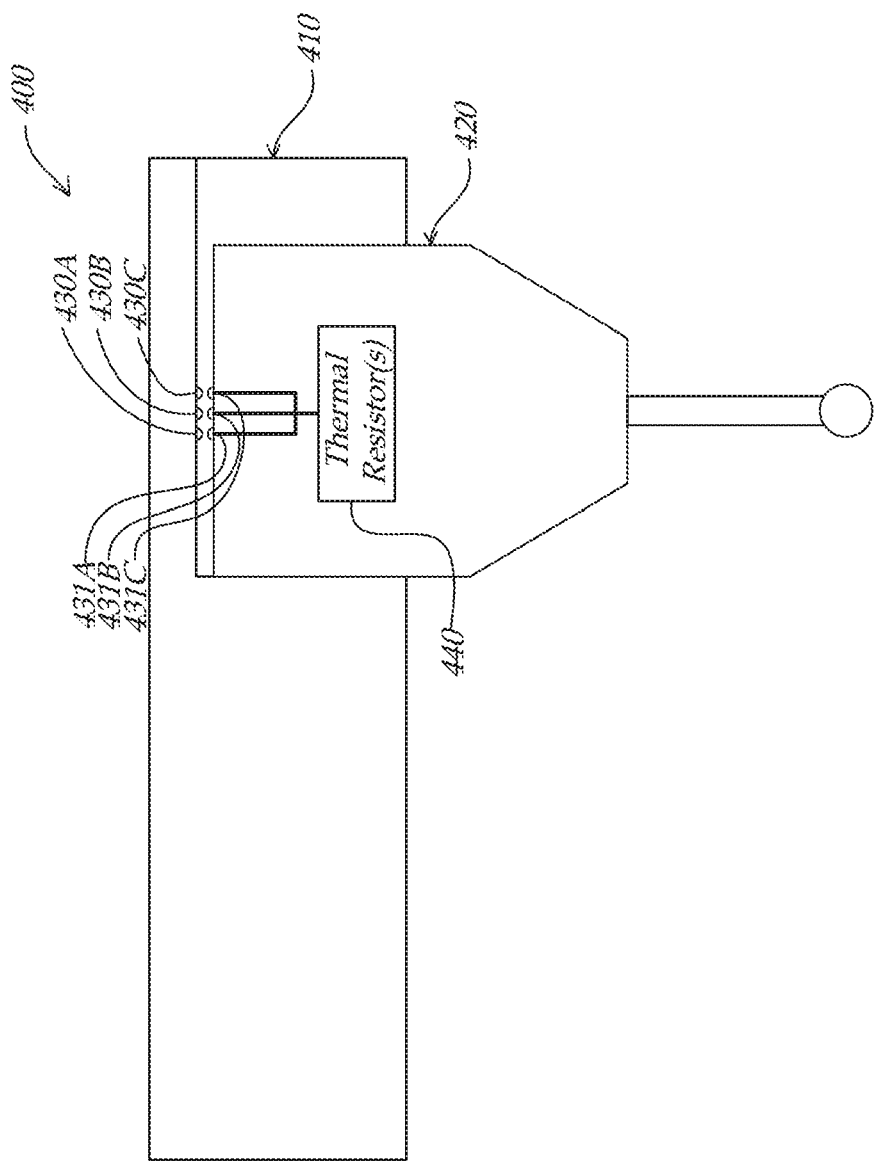
FIG. 4 is a partially schematic cross section illustration of a second prior art probe receptacle of a storage rack usable for powering a stored CMM probe.

Supplying power through electromagnetic induction also avoids the need for direct electrical contacts such as that shown in FIG. 3 and FIG. 4. Such electrical contacts may be subject to mechanical wear and corrosion, and unreliable connection for these and other reasons. Supplying power through electromagnetic induction may provide better reliability and lower assembly costs. Various implementations of the primary electromagnetic winding 259 may be easily retrofitted to a storage rack 200 (e.g. by attaching a primary electromagnetic winding module 250 to the storage rack 200 at any operable and convenient position, such as that illustrated in FIG. 2. Alternatively, the primary electromagnetic winding 259 may be located, or embedded, directly at any operable and convenient position within an element of the storage rack 200. The primary electromagnetic winding 259 may take any convenient and desirable form that is compatible with generating a desirable field for coupling to a secondary electromagnetic winding 199.

In various implementations, the primary electromagnetic winding 259 may comprise a coil including at least two turns. In various implementations, the secondary electromagnetic winding 199 may comprise a coil including at least two turns. Various configurations and circuits for transferring power through electromagnetic induction are known, and may be used or combined in various implementations according to principles disclosed herein. For example, various configurations and circuits are disclosed in U.S. patent application publications 2012/0228286; 2013/0162200; 2014/0120747; and 2014/0339914, each of which is hereby incorporated herein by reference in its entirety.

FIG. 3 is a cross section illustration of a prior art probe receptacle 310 of a storage rack 300. The storage rack 300 is similar to a storage rack disclosed in the '588 patent. The storage rack 300 comprises an electrical contact 330A and an electrical contact 330B which are configured to provide power to a laser 340 within the scanning CMM probe 310 through an electrical contact 331A and an electrical contact 331B on the side of the scanning CMM probe 310.

FIG. 4 is a cross section illustration of a prior art probe receptacle 410 of a storage rack 400. The storage rack 400 is similar to a storage rack disclosed in the '588 patent. The storage rack 400 comprises electrical contacts 430A, 430B and 430C. While attached to a CMM, the electrical contacts 430A, 430B and 430C are configured to transfer power to the CMM probe 410. The storage rack 400 comprises electrical contacts 431A, 431B and 431C. The storage rack 400 is configured to transfer power to the CMM probe 410 through a connection between the electrical contacts 431A, 431B and 431C and the electrical contacts 430A, 430B and 430C when the CMM probe 410 is detached from a CMM and placed in the probe receptacle 410. The CMM probe 410 is configured such that at least one thermal resistor 440 receives power from the storage rack 400. The at least one thermal resistor 440 provides heat to the CMM probe 410 in order to regulate its temperature.

Figure 5:
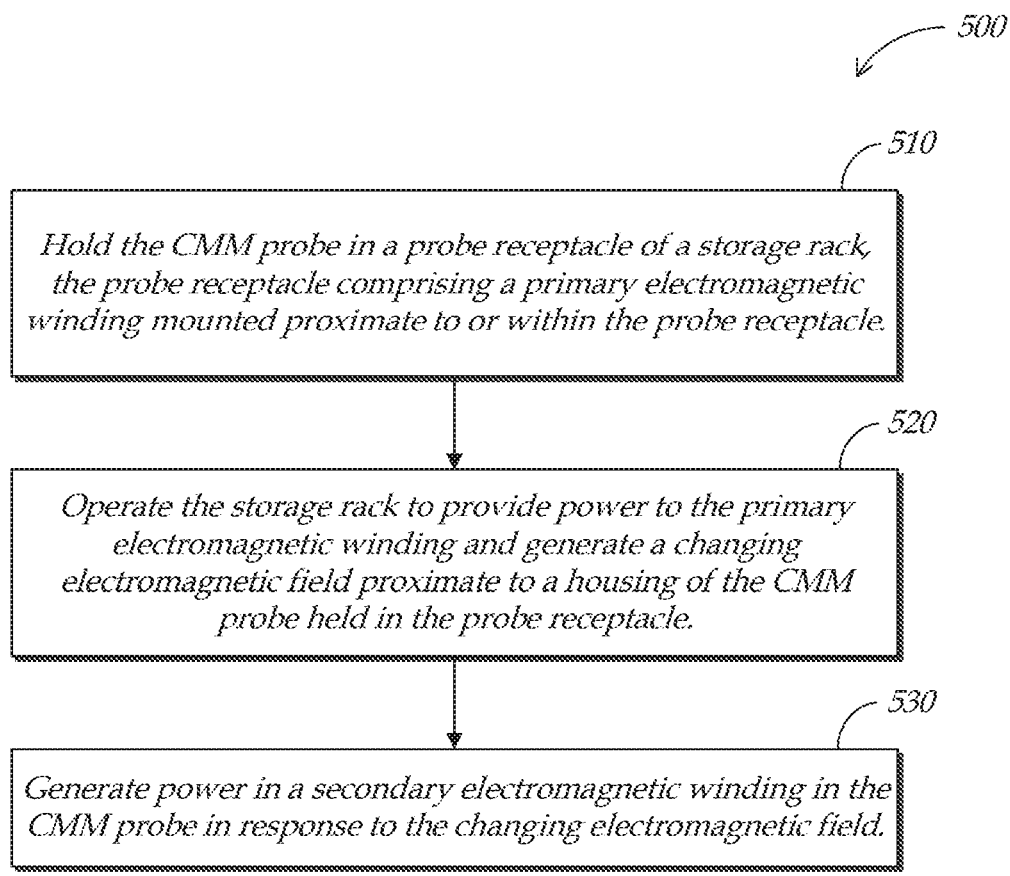
FIG. 5 is a flow diagram for a method of supplying power to a coordinate measurement machine probe.

FIG. 5 is a flow diagram of a method for providing power to at least one coordinate measurement machine (CMM) probe which is detached from a coordinate measurement machine.

At block 510, the CMM probe is held in a probe receptacle of a storage rack, the probe receptacle comprising a primary electromagnetic winding mounted proximate to or within the probe receptacle.

At block 520, the storage rack is operated to provide power to the primary electromagnetic winding and generate a changing electromagnetic field proximate to a housing of the CMM probe held in the probe receptacle.

At block 530, power is generated in a secondary electromagnetic winding in the CMM probe in response to the changing electromagnetic field.

The disclosure of U.S. provisional patent application Ser. No. 62/357,683, filed Jul. 1, 2016, is incorporated herein in its entirety.

Various alternative forms may be used to implement the principles disclosed herein. In addition, the various implementations described above can be combined to provide further implementations. Aspects of the implementations can be modified, if desired to employ concepts of the various patents and other references incorporated herein, or as otherwise known in the art, to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An power transfer configuration for providing power to a stored coordinate measurement machine (CMM) probe which is stored in a storage rack and is automatically attachable to and detached detachable from a coordinate measurement machine, wherein the storage rack is mounted proximate to a CMM and comprises a probe receptacle configured to accept and hold the CMM probe to be automatically inserted and removed from the probe receptacle by the CMM;

the power transfer configuration comprising:

a primary electromagnetic winding mounted to the storage rack proximate to or within the probe receptacle, the primary electromagnetic winding configured to receive power from an alternative current generating power supply and generate a changing electromagnetic field proximate to a housing of the CMM probe held in the probe receptacle; and a secondary electromagnetic winding located internally to and proximate to a housing of the CMM probe held in the probe receptacle, the secondary electromagnetic winding generating power usable inside the CMM probe, in response to the changing electromagnetic field.

2. The power transfer configuration of claim 1, wherein the secondary electromagnetic winding is configured to provide power to a heat regulating element included in electronic components of the CMM probe.

3. The power transfer configuration of claim 2, wherein the heat regulating element comprises at least some of the electronic components that are normally powered when the CMM uses and powers the CMM probe during measurement operations.

4. The power transfer configuration of claim 1, wherein the primary electromagnetic winding comprises a coil including at least two turns.

5. The power transfer configuration of claim 1, wherein the secondary electromagnetic winding comprises a coil including at least two turns.

6. A storage rack including a primary electromagnetic winding configured for use a in power transfer configuration for providing power to a stored coordinate measurement machine (CMM) probe which is stored in the storage rack and is automatically attachable to and detached detachable from a coordinate measurement machine, wherein the storage rack may be mounted proximate to a CMM and comprises a probe receptacle configured to accept and hold the CMM probe to be automatically inserted and removed from the probe receptacle by the CMM;

the power transfer configuration comprising:

the primary electromagnetic winding mounted to the storage rack proximate to or within the probe receptacle, the primary electromagnetic winding configured to receive power from an alternative current generating power supply and generate a changing electromagnetic field proximate to a housing of the CMM probe held in the probe receptacle; and a secondary electromagnetic winding located internally to and proximate to a housing of the CMM probe held in the probe receptacle, the secondary electromagnetic winding generating power usable inside the CMM probe, in response to the changing electromagnetic field.

7. The storage rack of claim 6, wherein the secondary electromagnetic winding is configured to provide power to a heat regulating element included in electronic components of the CMM probe.

8. The storage rack of claim 7, wherein the heat regulating element comprises at least some of the electronic components that are normally powered when the CMM uses and powers the CMM probe during measurement operations.

9. The storage rack of claim 6, wherein the primary electromagnetic winding comprises a coil including at least two turns.

10. The storage rack of claim 6, wherein the secondary electromagnetic winding comprises a coil including at least two turns.

11. A method for providing power to at least one coordinate measurement machine (CMM) probe which is detached from a coordinate measurement machine, the method comprising:

holding the CMM probe in a probe receptacle of a storage rack, the probe receptacle comprising a primary electromagnetic winding mounted proximate to or within the probe receptacle;

operating the storage rack to provide power to the primary electromagnetic winding and generate a changing electromagnetic field proximate to a housing of the CMM probe held in the probe receptacle; and generating power in a secondary electromagnetic winding in the CMM probe in response to the changing electromagnetic field.

* * * * *